(12) United States Patent
Sahoo et al.

(10) Patent No.: US 10,721,095 B2
(45) Date of Patent: Jul. 21, 2020

(54) VIRTUAL INTERFACE SYSTEM AND METHOD FOR MULTI-TENANT CLOUD NETWORKING

(71) Applicant: Oracle International Corporation, Redwood Shores, CA (US)

(72) Inventors: Sanjeeb Kumar Sahoo, Santa Clara, CA (US); Mahesh Kannan, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/970,713

(22) Filed: May 3, 2018

(65) Prior Publication Data

US 2019/0097838 A1 Mar. 28, 2019

Related U.S. Application Data

(60) Provisional application No. 62/563,554, filed on Sep. 26, 2017.

(51) Int. Cl.
*H04L 12/46* (2006.01)
*H04L 12/741* (2013.01)
*H04L 12/701* (2013.01)
*H04L 12/66* (2006.01)
*H04L 29/06* (2006.01)

(52) U.S. Cl.
CPC ...... *H04L 12/4625* (2013.01); *H04L 12/4641* (2013.01); *H04L 12/66* (2013.01); *H04L 45/00* (2013.01); *H04L 45/745* (2013.01); *H04L 63/0272* (2013.01)

(58) Field of Classification Search
CPC . H04L 12/4625; H04L 12/4641; H04L 12/66; H04L 45/745; H04L 45/00; H04L 63/0272
See application file for complete search history.

(56) References Cited

U.S. PATENT DOCUMENTS 5,784,569 A   7/1998  Miller
5,819,272 A  10/1998  Benson
(Continued)

FOREIGN PATENT DOCUMENTS

EP       0928089 A2    7/1999

OTHER PUBLICATIONS

"Proposal of the virtualized control system for the integrated management of multiple services", Kodama et al, Jan. 2017 (Year: 2017).*

(Continued)

*Primary Examiner* — Habte Mered
(74) *Attorney, Agent, or Firm* — Tucker Ellis LLP (57) ABSTRACT

Described herein are systems and methods that can support bridging VCNs in a manner which addresses customer needs with respect to access mechanisms, connectivity, regional availability, service complexity, and customer isolation/security. The system and methods that can support bridging VCNs as described herein have particular utility with respect to providing etcd-as-a-Service. In particular embodiments virtual network interface (VNIC) features are used to implement a bridge between a subnet of an etcd VCN and a subnet of a customer VCN in order to bridge the subnets.

20 Claims, 5 Drawing Sheets

(56) References Cited

U.S. PATENT DOCUMENTS

| | | | |
|---|---|---|---|
| 5,940,367 A | 8/1999 | Antonov | |
| 5,999,712 A | 8/1999 | Moiin | |
| 5,991,894 A | 11/1999 | Lee | |
| 6,487,622 B1 | 11/2002 | Coskrey | |
| 6,693,874 B1 | 2/2004 | Shaffer et al. | |
| 6,952,758 B2 | 10/2005 | Chron | |
| 7,139,925 B2 | 11/2006 | Dinker et al. | |
| 7,260,698 B2 | 8/2007 | Hepkin | |
| 7,376,953 B2 | 5/2008 | Togasaki | |
| 7,543,046 B1 | 6/2009 | Bae et al. | |
| 7,720,971 B2 | 5/2010 | Moutafov | |
| 7,739,677 B1 | 6/2010 | Kekre | |
| 7,792,977 B1 | 9/2010 | Brower | |
| 7,814,248 B2 | 10/2010 | Fong et al. | |
| 7,882,067 B2 | 2/2011 | Saika | |
| 7,953,861 B2 | 5/2011 | Yardley | |
| 8,209,307 B2 | 6/2012 | Erofeev | |
| 8,312,439 B2 | 11/2012 | Kielstra | |
| 8,397,227 B2 | 3/2013 | Fan | |
| 8,402,464 B2 | 3/2013 | Dice | |
| 8,595,714 B1 | 11/2013 | Hamer | |
| 9,319,272 B1* | 4/2016 | Brandwine | H04L 41/0806 |
| 9,609,060 B2 | 3/2017 | Kan | |
| 10,021,196 B1* | 7/2018 | Akers | H04L 67/16 |
| 2002/0035559 A1 | 3/2002 | Crowe | |
| 2002/0078312 A1 | 6/2002 | Wang-Knop | |
| 2003/0120715 A1 | 6/2003 | Johnson | |
| 2003/0187927 A1 | 10/2003 | Winchell | |
| 2004/0024973 A1 | 2/2004 | Chron | |
| 2004/0059805 A1 | 3/2004 | Dinker | |
| 2004/0267897 A1 | 5/2004 | Hill | |
| 2004/0179471 A1 | 9/2004 | Mekkittikul | |
| 2005/0021737 A1 | 1/2005 | Ellison et al. | |
| 2005/0083834 A1 | 4/2005 | Dunagan et al. | |
| 2005/0097294 A1 | 5/2005 | Hepkin | |
| 2007/0016822 A1 | 1/2007 | Rao et al. | |
| 2007/0118693 A1 | 5/2007 | Brannon et al. | |
| 2007/0140110 A1 | 6/2007 | Kaler | |
| 2007/0174160 A1 | 7/2007 | Solberg et al. | |
| 2007/0198605 A1 | 8/2007 | Saika | |
| 2007/0237072 A1 | 10/2007 | Scholl | |
| 2007/0271584 A1 | 11/2007 | Anderson et al. | |
| 2008/0183876 A1 | 7/2008 | Duvur | |
| 2008/0276231 A1 | 11/2008 | Huang | |
| 2008/0281959 A1 | 11/2008 | Robertson | |
| 2009/0144714 A1 | 6/2009 | Fan | |
| 2009/0265449 A1 | 10/2009 | Krishnappa et al. | |
| 2009/0320005 A1 | 12/2009 | Toub | |
| 2010/0064341 A1 | 3/2010 | Aldera | |
| 2010/0128732 A1 | 5/2010 | Jiang | |
| 2010/0312861 A1 | 12/2010 | Kolhi | |
| 2011/0041006 A1 | 2/2011 | Fowler | |
| 2011/0107135 A1 | 5/2011 | Andrews et al. | |
| 2011/0161289 A1 | 6/2011 | Pei | |
| 2011/0179231 A1 | 7/2011 | Roush | |
| 2011/0249552 A1 | 10/2011 | Stokes et al. | |
| 2011/0252192 A1 | 10/2011 | Busch | |
| 2012/0117157 A1 | 5/2012 | Ristock | |
| 2012/0158650 A1 | 6/2012 | Andre et al. | |
| 2012/0215740 A1 | 8/2012 | Vaillant et al. | |
| 2013/0263118 A1* | 10/2013 | Kannan | G06F 9/45558 718/1 |
| 2014/0173035 A1 | 6/2014 | Kan | |
| 2015/0058293 A1 | 2/2015 | Kobayashi | |
| 2018/0034821 A1* | 2/2018 | Basetty | G06F 9/45558 |
| 2018/0322136 A1* | 11/2018 | Carpentier | G06F 16/168 |
| 2019/0036733 A1* | 1/2019 | Feldpusch | H04L 12/4625 |

OTHER PUBLICATIONS

"Persistent Store-based Dual Replication System for Distributed SDN Controller", Sungwon Lee et al, 2016 (Year: 2016).*

"Network Security for Virtual Machine in Cloud Computing", H. Wu et al , 2010 (Year: 2010).*

European Patent Office, International Searching Authority, International Search Report and Written Opinion dated Jan. 12, 2016 for International Application No. PCT/US2015/052060, 14 pages.

European Patent Office, Examining Division, Communication pursuant to Article 94(3) EPC dated Sep. 1, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: (http://digitalcommons.unl.edu/cgi/viewcontent.cgi?article=10668&context=csearticles>.

Laurent Baduel et al., "Programming, Composing, Deploying for the Grid", Grid Computing: Software Environments and Tools, Springer, 30 pages, retrieved Jan. 21, 2016 from: (https://hal.inria.fr/inria-00486114/document>.

David Wong et al., "Java-based Mobile Agents", Communications of the ACM, Mar. 1999, vol. 42. No. 3, 11 pages.

United States Patent and Trademark Office, Office Action dated Aug. 8, 2017 for U.S. Appl. No. 15/200,908, 20 pages.

United States Patent and Trademark Office, Office Action dated Jun. 14, 2018 for U.S. Appl. No. 15/200,908, 18 pages.

United States Patent and Trademark Office, Office Action dated Apr. 18, 2019 for U.S. Appl. No. 15/200,908, 17 pages.

Oracle International Corporation, "Oracle9i JDBC Developer's Guide and Reference", Release 1, Apr. 21, 2014, 3 pages.

* cited by examiner

| Namespace ns1 - Route Table |
|---|
| 10.0.0.0/16 -> cokevlan |
| 192.168.1.0/24 -> veth-private |
| default -> cokevlan |

FIGURE 4C

| default/global - Route Table |
|---|
| 10.0.0.0/16 -> ens3f0 |
| 192.168.1.0/24 -> veth-global |
| default -> ens3f0 |

VIRTUAL INTERFACE SYSTEM AND METHOD FOR MULTI-TENANT CLOUD NETWORKING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application No. 62/563,554 filed Sep. 26, 2017 titled "VIRTUAL INTERFACE SYSTEM AND METHOD FOR MULTI-TENANT CLOUD NETWORKING" which application is incorporated by reference in its entirety.

FIELD OF INVENTION

The present invention is generally related to computer systems, and is particularly related to systems and methods for bridging multiple cloud networks.

SUMMARY

Described herein are systems and methods that can support bridging multiple cloud networks. In particular the present disclosure describes a system and method for bridging between a first virtual cloud networks (VCN) and a second VCN to provide a multitenant service.

A VCN is a customizable private network in a Cloud Infrastructure for example Oracle Cloud. Just like a traditional data center network, a VCN provides a customer complete control over the customer network environment. This includes allowing the customer to assign their own private IP address space, create subnets, create route tables and configure stateful firewalls. A single tenant can have multiple VCNs, thereby providing grouping and isolation of related resources.

A VCN can be configured to make use of managed services in a Platform as a Service (environment). The managed service can be provided in a separate VCN managed by the service provider. In order to make use of the managed service, communication must be enabled between the customer VCN and the separate VCN managed by the service provider. Moreover, the service may provide the managed service to multiple customers and therefore communication must be enabled between multiple customer VCNs and the separate VCN managed by the service provider.

The need to allow a customer complete control of their customer network environment, in combination with the need to allow multiple customer VCNs to communicate with a single service-providing VCN managed by the service provider raises certain problems with respect to access mechanisms, connectivity issues, regional availability, service complexity, and customer isolation/security. Accordingly, the present disclosure describes a system and method for bridging VCNs which addresses the needs with respect to access mechanisms, connectivity, regional availability, service complexity, and customer isolation/security.

In embodiments the present disclosure provides a system comprising a customer virtual cloud network (VCN) comprising one or more customer subnets; a service provider VCN comprising one or more service provider subnets; and a VCN bridge which enables a client in any of the customer subnets of the customer VCN to access a server providing a service in one of the service provider subnets of the service provider VCN. In this particular embodiment the multitenant service comprises etcd-as-a-service.

These and other objects and advantages of the present invention will become apparent to those skilled in the art from the following description of the various embodiments, when read in light of the accompanying drawings.

DETAILED DESCRIPTION

Described herein are systems and methods that can support bridging VCNs in a manner which addresses customer needs with respect to access mechanisms, connectivity, regional availability, service complexity, and customer isolation/security. The system and methods that can support bridging VCNs as described herein have particular utility with respect to providing an etcd store implemented in a distributed computing environment as described below with respect to FIG. 1. An etcd service is a distributed key value store which is often used for storage of configuration information for large scale distributed systems. The system and methods that can support bridging VCNs disclosed herein may also be applied in wide variety of multitenant PaaS environments and for the provision of a wide variety of cloud services.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Computing Environment

Figure 1:
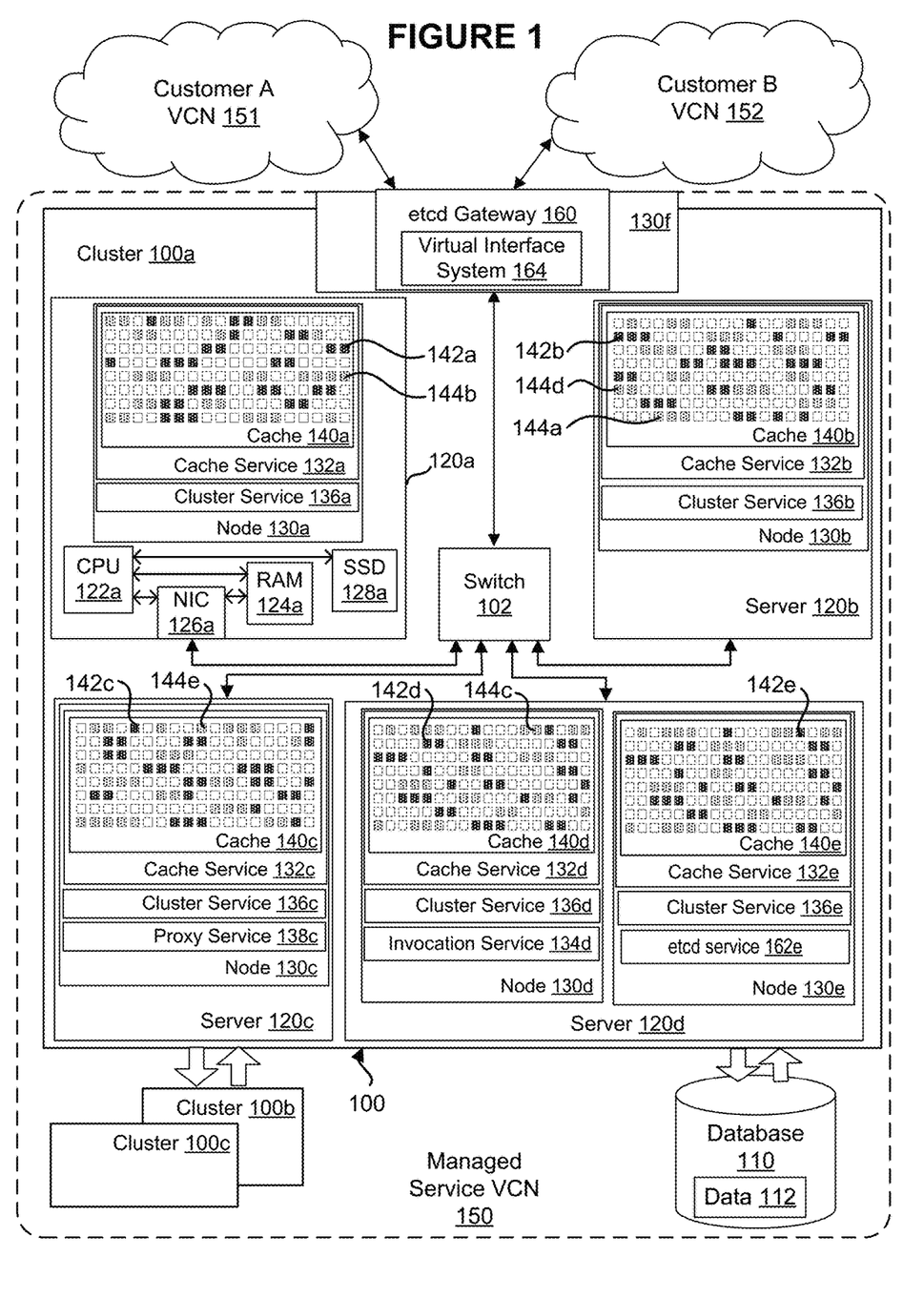
FIG. 1 illustrates a distributed computing environment incorporating a virtual interface system according to an embodiment.

FIG. 1 illustrates a distributed computing environment comprising a distributed data grid. A distributed data grid is a distributed computing system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides an etcd store for multiple tenants including for example to Customer A Customer B. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to Tenant A and Tenant B against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid. Agents allows for execution of code/functions on nodes of the distributed data grid (typically the same node as data required for execution of the function is required). Distributed execution of code, such as agents, on the nodes of the cluster allows the distributed data grid to operate as a distributed computing environment.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that Customers A and B and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments, the distributed data grid 100 of FIG. 1 is configured to implement an etcd store which provides etcd services to a multiple tenants. Etcd service instances may be provided on storage enable nodes of the cluster 100 (one etcd service instance 162e is shown on node 130e). The etcd store offers cloud customers (tenants) fully managed etcd stores. Each etcd service instance (such as etcd service instance 162e) has a unique service name. Multiple etcd service instance operate in the cluster. Different tenants/customers utilize different etcd service instances thereby allowing complete isolation of customer data.

Modern cloud native applications use microservices that are often deployed across multiple machines running in different availability domains. These services usually rely on a consistent view of the underlying infrastructure cluster state and configuration data. The application etcd is a consistent, distributed key-value store developed by the CoreOS team. It is a solution for consensus-based problems like service discovery, cluster state and configuration data, distributed locking and leader elections. However the etcd application is not natively multi-tenant aware.

Oracle etcd Cloud Service is a cloud service that provides a simple way to provision, manage and scale etcd. The Oracle etcd Cloud Service is a multitenant aware service application which can provide etcd services to multiple customers/tenant simultaneously while preserving isolation and security of the customer data. Customers can provision one or more etcd stores using console or REST API.

When provisioned the etcd cloud service provides native etcd functionality via an etcd API though e.g. etcd service 162e. Customers can simply consume etcd APIs while the Oracle etcd Cloud Service handles all the operational complexities from configuring and managing etcd clusters to isolating, scaling, backing up, patching and upgrading them. Thus, for example, an etcd API service front end can be used for data access with the Coherence data grid cluster of FIG. 1 providing the backend key\value store in Caches 140a, 140b, 140c, 140d, 140e. In short, Oracle etcd Cloud Service provides protocol-compliant native etcd experience with zero management and operations overhead.

Access to the etcd store is provided by one or more gateways 160 (although only a single gateway is shown, multiple gateways are usually provided for redundancy and throughput). An etcd Gateway 160 is a stateless component (on a storage disabled node 130f) responsible for routing etcd requests from customers via switch 102 to the appropriate storage-enabled nodes 130a, 130b, 130c, 130d, 130e in the cluster 100 associated with the appropriate service instance id. In embodiments, the etcd gateway 160 implements a virtual interface system 164 which provides a secure connection between customer VCNs (e.g. Customer A VCN 151 and Customer B VCN 152) and the Managed Service VCN 150 from which the Oracle etcd Cloud Service is provided.

The etcd gateway 160 is under the control of the etcd service provider and can be used to serve a plurality (N) customers. Multiple etcd gateways can operate in parallel to provide for additional throughput, availability and failover. Each etcd gateway 160 runs multitenant aware software in virtual interface system 164 which allows it to connect to the VCNs of the plurality of Customers (tenants). The multitenant aware software is also configured to correctly attribute etcd requests from the plurality of customers to the particular customers from which they are received and route the requests to the correct named etcd service within the Cluster 100 of Managed Service VCN 15 as will be described below. The etcd service will then store or return key/value data from the etcd store to the customer according to the etcd API. The virtual interface system 164 is configured to avoid network address/routing conflicts and also to ensure etcd service requests are appropriately identified as belonging to the customer from whose VCN they received such that the multitenant aware Oracle etcd Cloud Service can properly route and respond to the etcd service request.

Virtual Cloud Network (VCN)

A VCN is a customizable private network in a Cloud Infrastructure for example Oracle Cloud. Just like a traditional data center network, a VCN provides a customer complete control over the customer network environment. This includes allowing the customer to assign their own private IP address space, create subnets, create route tables and configure stateful firewalls. A single tenant can have multiple VCNs, thereby providing grouping and isolation of related resources.

The physical computer servers in Cloud Infrastructure data centers have physical network interface cards (NICs). When a server application instance/node is initiated on one of these servers, the server application instance communicates using networking service virtual NICs (VNICs) associated with the physical NICs. A VNIC enables a server application instance to connect to a VCN and determines how the server application instance connects with endpoints inside and outside the VCN. Each VNIC resides in a subnet in a VCN. Each server instance has a primary VNIC that is automatically created and attached during launch. That VNIC resides in the subnet the customer specifies during launch. The primary VNIC cannot be removed from the server instance. Each VNIC has a primary private IPv4 address from the subnet the VNIC is in and, A MAC address.

The application server instance can also be provided with secondary VNICs after launch. The secondary VNIC can be in a subnet in the same VCN as the primary VNIC or a different VCN. The availability of secondary VNIC has useful features as described below. For example, secondary VNICs allow a customer to use their own hypervisor on a bare metal instance. The virtual machines on the bare metal instance each have their own secondary VNIC, giving direct connectivity to other instances and services in the VNIC's VCN. For example, additional secondary VNICs allow a server instance to connect to multiple subnets: For example, a customer might have a network appliance to monitor traffic between subnets, so the instance needs to connect to multiple subnets in the VCN. Secondary VNICs also allow a customer to connect an instance to multiple VCNs: For example, you might have resources that need to be shared between two teams that each have their own VCN.

In embodiments of the present invention, the secondary VNIC capability is used to allow a gateway to connect to a managed service provider VCN as well as a plurality of customer/tenant VCNs. The gateway is launched on a server within the managed service VCN and is assigned a primary VNIC in a subnet of the managed service provided VCN. Secondary VNICs can be attached to the gateway for each of a plurality of customer/tenant VCNs communicating with the gateway.

In embodiments of the present invention, a customer VCN (FIG. 1, Customer A VCN 151, Customer B VCN 152) can be configured to make use of managed services in a Platform as a Service (environment). The managed service can be provided in a separate VCN managed by the service provider (FIG. 1, Managed Service VCN 150). In order to make use of the managed service, communication must be enabled between the customer VCN and the separate VCN managed by the service provider. Moreover, the service may provide the managed service to multiple customers and therefore communication must be enabled between multiple customer VCNs and the separate VCN managed by the service provider. In the example of FIG. 1, multiple customer VCNs are enabled to communicate with the Oracle VCN which provides a managed etcd service.

The need to allow a customer complete control of their customer network environment, in combination with the need to allow multiple customer VCNs to communicate with a single service-providing VCN managed by the service provider raises certain problems with respect to access mechanisms, connectivity issues, regional availability, service complexity, and customer isolation/security and identity. Accordingly, the present disclosure describes a virtual interface system 164 and method for bridging VCNs which addresses the needs with respect to access mechanisms, connectivity, regional availability, service complexity, and customer isolation/security and identity.

An example of a managed service is etcd-as-a-service. An etcd-as-a-service offers cloud customers (tenants) fully managed etcd stores. Customers can provision one or more etcd stores using console or REST API. A provisioned etcd store is often represented by a set of URLs. An etcd stored is typically used either for configuration management of a distributed system or coordination among nodes of a distributed system. However, quite often these distributed systems are the backend of an Internet facing application and live very close to the data tier. Customers run these distributed systems in separate secured subnets. For security reasons the distributed systems subnets (backend) often do not have Internet connectivity and thus are unable to communicate to etcd-store via the public Internet to the set of URLs.

The lack of Internet connectivity precludes use of an etcd-as-a-service architecture which provides the customer with a single highly available URL to access etcd-store at where access to the service is easily balanced by a load-balancing service from the single highly available URL to a set of URLs. Instead, a secure gateway (e.g. Gateway 160 of FIG. 1) is used between the customer distributed systems backend (e.g. FIG. 1, Customer A VCN 151, Customer B VCN 152) and the subnet hosting the etcd-stores (e.g. Managed Service VCN 150). However, providing a secure gateway between the customer subnets (backend) and the subnet providing etcd-stores leads to an n+1 problem as described below.

Figure 3:
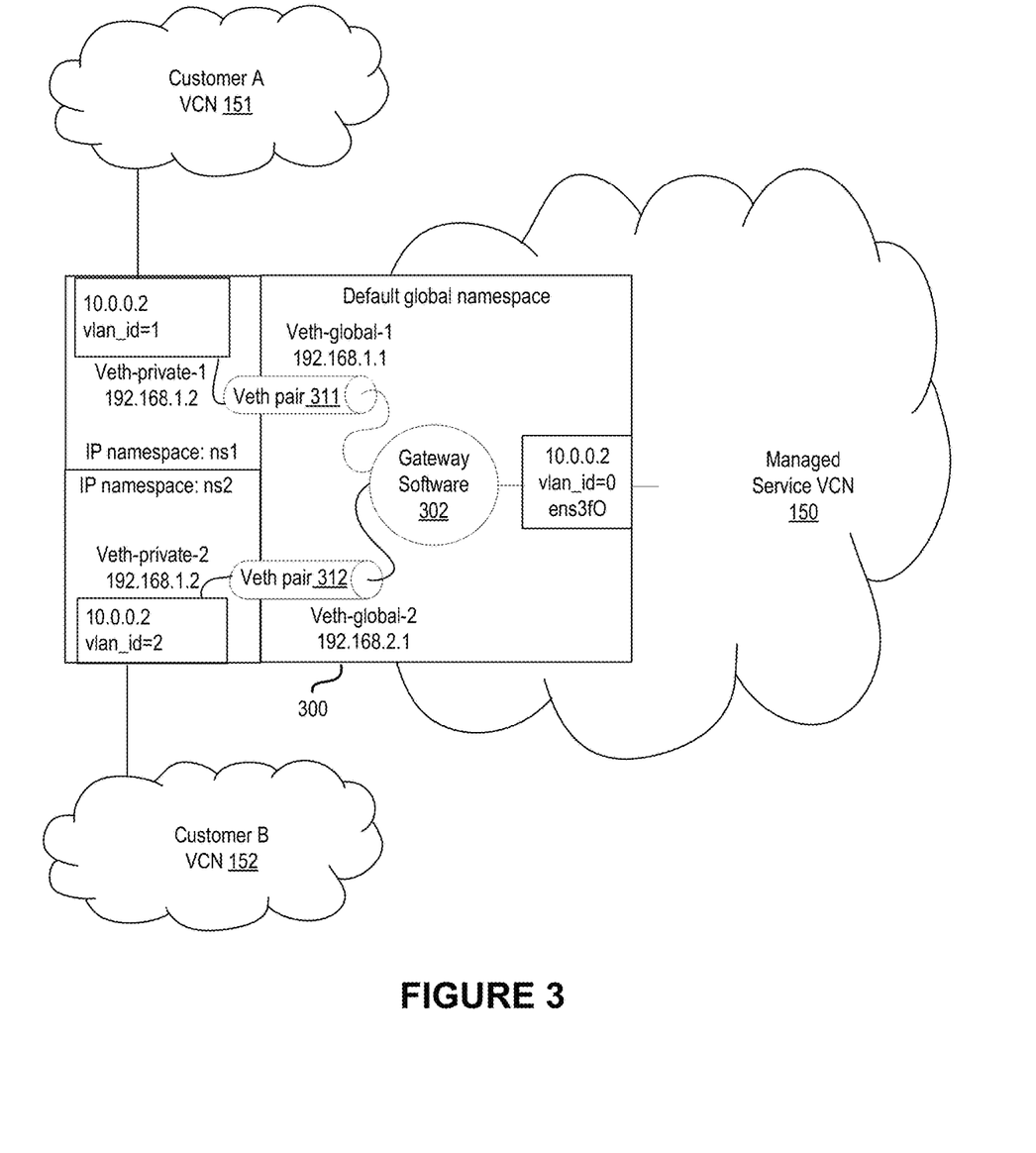
FIG. 3 illustrates a virtual interface system providing a solution to address space conflicts according to an embodiment.

To provide a fully managed etcd store with QoS guarantees, the service provider must have total control over the hosts—including the host networking stack—running the etcd software and underlying data. Likewise, each customer VCN provides a customer complete control over the customer network environment including includes allowing the customer to assign their own private IP address space, create subnets, create route tables and configure stateful firewalls. As shown in FIG. 3, this leads to an n+1 VCNs situation, where n is the number of customer VCNs and there is always another VCN (+1) (the Managed Service VCN 150) providing the etcd service.

Because each of the customers and the etcd service provider each have total control over their own networking stacks, there is an unavoidable potential for address space conflict between the customers and etcd service provider at the gateway through which they interact. Moreover, end points of one customer/tenant's etcd store must not be accessible to another customer/tenant without requiring specific actions by the owner of the store. Moreover, it is important for the service provider to be able to identify the customer source of service requests in order to appropriately handle the requests. The requirement to securely isolate and identify different tenants makes it difficult to build a solution to bridge the customer and etcd-dataplane VCNs which utilize public IP addresses.

Figure 2:
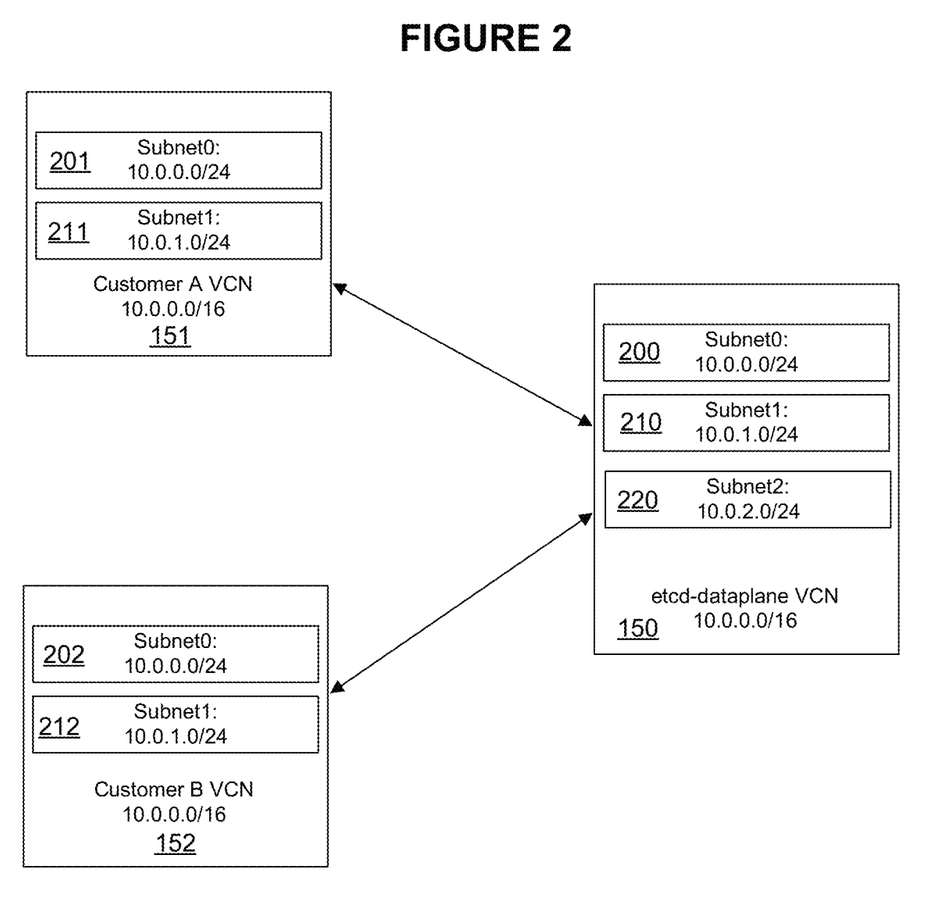
FIG. 2 illustrates a multiple VCN environment having an address space conflict.

FIG. 2 shows multiple VCN environment with an address space conflict illustrating the technological networking problem which is address by the present disclosure. As shown in FIG. 2, Customer A VCN 151 includes Subnet0 201 and Subnet 1 211 and Customer B VCN 152 includes Subnet0 202 and Subnet1 212. It is desired for the subnets of the Customer A VCN 151 and Customer B VCN 152 (and additional customer VCN not shown) to both be able to access etcd-store hosted in an etcd-dataplane Managed Service VCN 150.

The etcd-dataplane Managed Service VCN 150 includes Subnet0 200, Subnet1 210 and Subnet 2 220. As shown in FIG. 2, Subnet 1 211 of Customer A VCN 151 and Subnet1 212 of Customer B VCN 152 have both been assigned the same address by their respective customers. Thus, these subnets contend for the same address space 10.0.1.0/24. This contention could lead to network and communication problems as well as privacy/security violations at the etcd store. Accordingly, a technological solution to this network address space contention when bridging private networks. Thus, because each customer VCN 151, 152 uses private IP address ranges and don't have Internet connectivity, a solution is needed to bridge the customer VCNs to the Managed Service VCN 150 providing etcd-as-a-service while overcoming address space contention issues. Additionally, it is important for the etcd store to be able to identify the source of etcd service requests.

The solution addresses a number of requirements. An etcd end point should be accessible from one or more private subnets of customer wherein a private subnet refers to a subnet lacking any route to the Internet. The customer should be able to configure which hosts in their system can access the etcd endpoint using security rules available to them at VCN level and host level. The etcd store should provide regional availability, i.e., failure in one availability domain does not impact the customer. If a customer is running their client in multiple availability domains, then the customer can access the etcd store from the rest of the availability domains. Customers should be able to use available etcd client libraries or even simple http libraries to access the etcd store. In other words, the solution should not require any change to the etcd communication protocol such as extra HTTP headers. Additionally, end points of one customer/tenant's etcd store must not be accessible to another customer/tenant without requiring specific actions by the owner of the store.

FIG. 3 illustrates a technological solution to the problem identified with respect to FIG. 2. As shown in FIG. 3, Customer A VCN 151 and Customer VCN 152 are connected to Managed Service VCN 150 through a host system/gateway 300. In an embodiment gateway 300 is a storage disabled member of a coherence cluster. The host system/gateway 300 runs multitenant-aware gateway software 302. The host system gateway is configured with multiple VNICs. The gateway is configured to serve requests for all stores. It listens for all the interfaces of the veth-pair in the global namespace. Since each of them has a unique IP address, it uses that to determine the tenant context. This allows identification of the customer source of the requests.

Customer A VCN 151 connects to endpoint 10.0.0.2 vlan_id=1 in IP namespace ns1. A virtual Ethernet pair 311 192.168.1.2-192.168.1.1 connects the endpoint to the gateway software 302. Likewise Customer B VCN 152 connects to endpoint 10.0.0.2 vlan_id=2 in IP namespace ns2. A virtual Ethernet pair 312 192.168.1.2-192.168.2.1 connects the endpoint to the gateway software 302. Gateway software 302 listens/receives messages from both veth pairs 311, 312, however based on the address of the veth pair in the global namespace (192.168.1.1 or 192.168.2.1) from which the message is received, the gateway software 302 can properly identify the source of a message. Moreover, the address spaces are de-conflicted/resolved in the global namespace under the control of the managed service provider without the need for action on the part of each tenant. The gateway software 303 can route messages to the appropriate service within managed service VCN 150 using customer identify information derived from the address at which messages are received in the global namespace (which do not conflict) rather than (potentially conflicting) addresses in the IP namespaces ns1 and ns2 of Customers A and B.

Security Implications

The present disclosure describes a solution which has the capability of bridging multiple customer VCNs and a managed service VCN. The solution relies on using secondary virtual network interface card (VNIC) support in a compute and network VCN service. The Secondary VNIC feature allows the physical NIC of a particular host to appear as multiple virtual NICs within the particular host wherein each of the multiple virtual NICs has its own a distinct MAC address. Each such VNIC is given a unique 802.1q Virtual Local Area Network (VLAN) id. This enables creation of multiple (VLANs) between each physical NIC and the host. This feature works for both bare metal (BM) and virtual machine (VM) and type instances, although for VMs, there is no need to configure VLANs on the host side. Virtual Machines use hardware support such as SR-IOV in the physical NIC to directly expose VNICs in the host without having to configure VLANs in the host side. The use of the secondary virtual network interface card (VNIC) support allows address space conflict avoidance as described below.

Figure 4A:
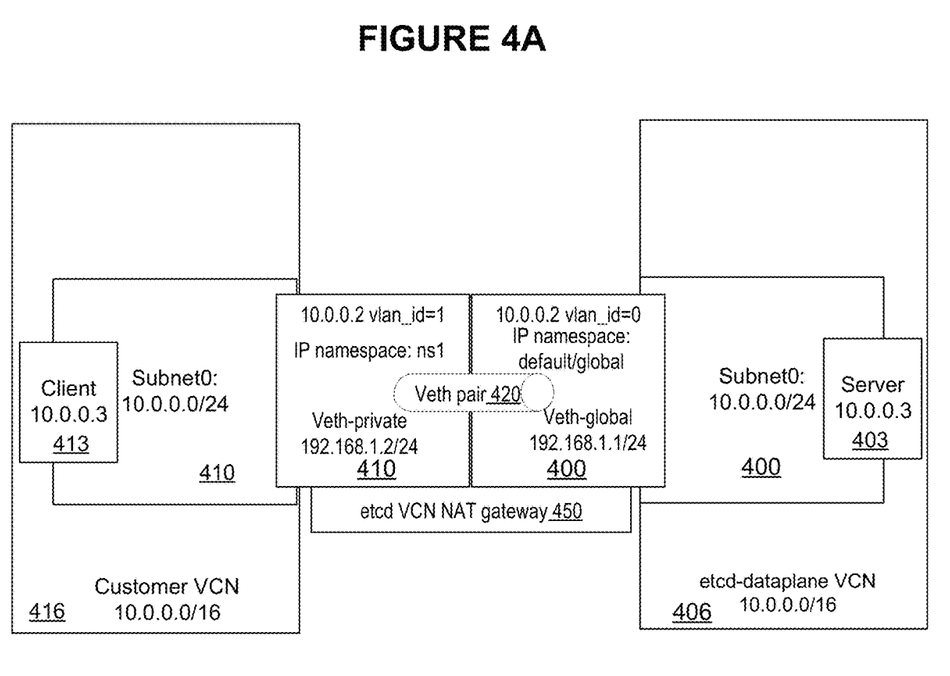
FIGS. 4A-4C illustrate a VCN bridge system providing a solution to address space conflicts according to an embodiment.
Figure 4B:
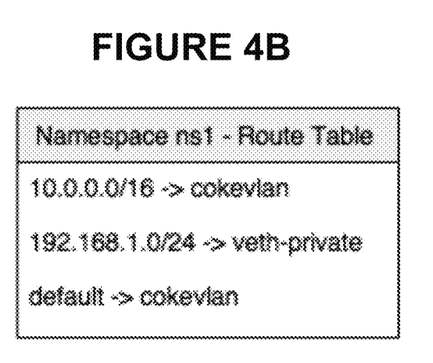
Figure 4C:
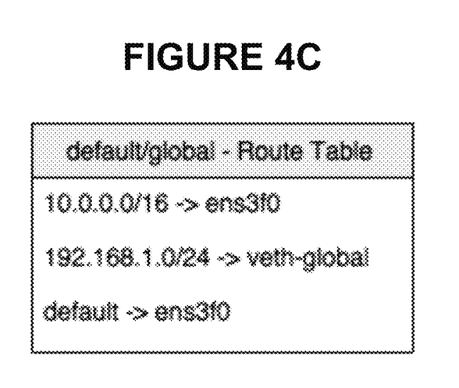

FIGS. 4A-4C illustrate a VCN bridge system providing a solution to address space conflicts according to an embodiment. FIGS. 4A-4C illustrates an embodiment of a solution involving bare metal instance types. However, the solution is identical for virtual machine instance types with the exception of the VLAN creation. FIG. 4A shows two VCNs: Customer VCN 416 and etcd data plane VCN 406 with overlapping address space: 10.0.0.0/16. There are two subnets: Customer Subnet0 410 with address space 10.0.0.0/24 and etcd data plane subnet0 400 with address space 10.0.0.0/24. The instance on the left is the etcd client 413 and right is etcd server 403. In general, a secondary VNIC is attached to the gateway service instance for each customer VCN with which the gateway communicates. These secondary VNICS have addresses within the customer namespace. Each secondary VNICS is then connected by a virtual Ethernet pair to the primary VNIC of the gateway in the global namespace. The gateway software receives messages over the veth pairs and identifies and handles the messages as appropriate to their source (and according to the configured routing tables shown in FIGS. 4A and 4B)

As shown in FIG. 4A, to provide a solution to address space conflicts, an etcd VCN Network Address Translation (NAT) gateway 450 is used to bridge between Customer 1 VCN 116 and etcd data plane VCN 106. The gateway is launched in the etcd-dataplane subnet 106 and got primary IP of 10.0.0.2. In an embodiment the gateway comprises multi-tenant aware gateway software operating on a storage disabled host in a managed service VCN. For example the gateway is Using attachVnic API as introduced to support Secondary VNIC feature, the etcd VCN NAT gateway is attached to Customer subnet 410 and the attachment is given an IP address of 10.0.0.2. This collision may not always happen, but the potential for conflict is unavoidable, and the conflict here is used to demonstrate that the solution provided by etcd VCN Network Address Translation (NAT) gateway 450 works even in the face of collision. This can be repeated for multiple customers/tenants.

Each secondary VNIC of the VCN Network Address Translation (NAT) gateway 450 is associated with following information: MAC Address, VLAN ID, and IP Address. This information is used while invoking host management facility like ssh to first create a MACVLAN device and associate it with a VLAN device called customer1_vlan. In order to avoid route table clashing due to overlapping IP, a new namespace called ns1 is created and customer1_vlan device is moved to that namespace ns1. A virtual Ethernet (veth) pair 420 of veth devices called {veth-global, veth-private} is created to connect IP namespace ns1 to the default/global namespace. The veth-global and veth-private devices are associated with global and ns1 namespaces respectively with IP addresses set as 192.168.1.1/24 and 192.168.1.2/24. Messages may be routed between the Client 413 in the Customer VCN 416 and the Server 403 in the etcd-dataplane VCN 406 using the veth pair 420 established in the etcd VCN NAT gateway 450. These actions are performed in the gateway and can be repeated for multiple customers/tenants.

FIG. 4B illustrates the namespace ns1 route table. FIG. 4C illustrates the default/global namespace route table. The IP table rules are configured by the gateway in NAT table to forward traffic from secondary VNIC to primary VNIC in the managed service VCN and thence to a particular named service (for example etcd named service 3/0) in the managed service VCN.

-A PREROUTING -i customer1_vlan -p tcp -j DNAT -to-destination 192.168.1.1

-A POSTROUTING -o veth-private -p tcp -j SNAT --to-source 192.168.1.2.

Similar routing tables can be used for routing from a customer 2 or multiple customers (n) to multiple named services services with the managed service VCN. The routing tables correlate the source of etcd requests received at the gateway with the appropriate named service. Different named services are provided for each customer store. Accordingly the multi-tenant aware gateway software allows for avoiding conflicts between network addresses of multiple customer/tenants (solves the n+1 problem), isolates customer information, and also allows for proper identification of customers and appropriate routing of service requests.

There are various ways to leverage the VCN bridge solution to provide a multi-tenant service. In the current context, we are using it in the etcd-gateway. In one embodiment a single instance of the etcd-gateway is configured in the global namespace of the etcd NAT gateway for every etcd store. The etcd control panel is updated to manage the lifecycle of etcd VCN NAT gateway. Although it may appear complicated to expose multiple endpoints for a single etcd store, this is actually beneficial from a failover perspective. The system can readily switch to an alternative endpoint in the case of failure of any one endpoint. As is the case for many distributed systems, the official go client library for etcd takes care of the cluster shape change events transparently.

In an alternative embodiment, an etcd-proxy is used. Users have the option to configure an etcd-proxy with a set of etcd endpoints that are provided to them at provisioning time and run it locally or in a side-car container, which is a very common pattern to this kind of problems in a container environment. Doing so will allow the etcd-client to connect to the etcd-proxy using the default URL of etcd. Etcd also supports DNS-based (domain name servers) service discovery and it is exposed by etcdctl as well. When DNS service record (SRV) support is available in OBMC, it can be integrated with that to provide a single SRV record identifier for an etcd store which user can use to retrieve the list of actual URLs. That way, users can launch an etcdctl just like this:

\# Look for etcd service in prod subnet $ etcdctl --discovery-srv prod.customer_1.oraclevcn.com

. . . .

In fact, etcd proxy can be configured to locate the servers using DNS, thus further simplifying configuration of etcd clients.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. See, e.g. "The NIST Definition of Cloud Computing", Special Publication 800-145 (2011). Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting virtual cloud networking, the system comprising:
   a first customer virtual cloud network (VCN) comprising a first customer subnet configured with a first private namespace;
   a second customer virtual cloud network (VCN) comprising a second customer subnet configured with a second private namespace;
   a service provider VCN comprising a service provider subnet configured with a global namespace; and
   a VCN bridge which comprises,
      a first virtual network interface card (VNIC) configured in the first customer subnet and having an address in the first private namespace,
      a second VNIC configured in the second customer subnet and having an address in the second private namespace,
      and a global VNIC configured in the service provider subnet and having an address in the global namespace;
      a first virtual Ethernet (Veth) pair communicating between the first VNIC and the global VNIC, wherein the VCN bridge enables a first client in the first customer subnet of the first customer VCN to access a server providing a service in the service provider subnet of the service provider VCN via the first Veth pair; and
      a second Veth pair communicating between the second VNIC and the global VNIC, wherein the VCN bridge enables a second client in the second customer subnet of the second customer VCN to access a server providing a service in the service provider subnet of the service provider VCN via the second Veth pair.

2. The system of claim 1, further comprising:
   a gateway server within the service provider VCN wherein the VCN bridge executes on the gateway server;
   wherein the gateway server is assigned the global VNIC as a primary VNIC;
   wherein the first VNIC and second VNIC are secondary VNICS of the gateway server attached to the first customer subnet and second customer subnet respectively.

3. The system of claim 2, wherein:
   the gateway server deconflicts addresses in the first private namespace and the second private namespace.

4. The system of claim 3,
   the gateway server deconflicts addresses in the first private namespace and the second private namespace using information properties of the first VNIC and Second VNIC.

5. The system of claim 1, wherein the VCN bridge comprises one or more routing tables configured to provide for routing of messages between the service provider VCN and the first customer VCN and the second customer VCN.

6. The system of claim 1, wherein the VCN bridge ensures isolation of a the first customer VCN and the second customer VCN utilizing the service provided by the service provider VCN.

7. The system of claim 1, wherein the service is an etcd-as-a-service.

8. A method for providing a service to a first customer virtual cloud network (VCN) comprising a first customer subnet configured with a first private namespace and a second customer virtual cloud network (VCN) comprising a second customer subnet configured with a second private namespace, the method comprising:
   providing a service provider VCN comprising a service provider subnet configured with a global namespace; and
   providing a VCN bridge;
   configuring within the VCN bridge a first virtual network interface card (VNIC) configured in the first customer subnet and having an address in the first private namespace,
   configuring within the VCN bridge a second VNIC configured in the second customer subnet and having an address in the second private namespace,
   configuring within the VCN bridge a global VNIC configured in the service provider subnet and having an address in the global namespace;
      providing a first virtual Ethernet (Veth) pair communicating between the first VNIC and the global VNIC, wherein the VCN bridge enables a first client in the first customer subnet of the first customer VCN to access a server providing the service in the service provider subnet of the service provider VCN via the first Veth pair; and
   providing a second Veth pair communicating between the second VNIC and the global VNIC, wherein the VCN bridge enables a second client in the second customer subnet of the second customer VCN to access a server providing a service in the service provider subnet of the service provider VCN via the second Veth pair.

9. The method of claim 8, further comprising:
   providing a gateway server within the service provider VCN wherein the VCN bridge executes on the gateway server;
   wherein the gateway server is assigned the global VNIC as a primary VNIC;
   wherein the first VNIC and second VNIC are secondary VNICS of the gateway server attached to the first customer subnet and second customer subnet respectively.

10. The method of claim 9, further comprising:
    deconflicting addresses in the first private namespace and the second private namespace using the gateway server.

11. The method of claim 9, further comprising:
    deconflictinq addresses in the first private namespace and the second private namespace using information properties of the first VNIC and Second VNIC in the gateway server.

12. The method of claim 11, further comprising:
maintaining one or more routing tables configured to provide for routing of messages between the service provider VCN and the first and second customer VCNs.

13. The method of claim 12, further comprising:
isolating the first customer VCN and the second customer VCN utilizing the service.

14. The method of claim 12, wherein:
providing a managed service comprises providing a managed etcd-as-a-service.

15. A non-transitory computer-readable medium including instructions stored thereon for supporting providing a service to a first customer virtual cloud network (VCN) comprising a first customer subnet configured with a first private namespace and a second customer virtual cloud network (VCN) comprising a second customer subnet configured with a second private namespace, which instructions, when executed, cause a virtual cloud networking environment to perform steps comprising:

providing a service provider VCN comprising a service provider subnet configured with a global namespace; and providing a VCN bridge;

configuring within the VCN bridge a first virtual network interface card (VNIC) configured in the first customer subnet and having an address in the first private namespace, configuring within the VCN bridge a second VNIC configured in the second customer subnet and having an address in the second private namespace, configuring within the VCN bridge a global VNIC configured in the service provider subnet and having an address in the global namespace;

providing a first virtual Ethernet (Veth) pair communicating between the first VNIC and the global VNIC, wherein the VCN bridge enables a first client in the first customer subnet of the first customer VCN to access a server providing the service in the service provider subnet of the service provider VCN via the first Veth pair; and providing a second Veth pair communicating between the second VNIC and the global VNIC, wherein the VCN bridge enables a second client in the second customer subnet of the second customer VCN to access a server providing a service in the service provider subnet of the service provider VCN via the second Veth pair.

16. The non-transitory computer-readable medium of claim 15, the instructions further comprising:

executing the VCN bridge a gateway server within the service provider VON;

wherein the gateway server is assigned the global VNIC as a primary VNIC;

wherein the first VNIC and second VNIC are secondary VNICS of the gateway server attached to the first customer subnet and second customer subnet respectively.

17. The non-transitory computer-readable medium of claim 16, the instructions further comprising:

deconflicting addresses in the first private namespace and the second private namespace using the gateway server.

18. The non-transitory computer-readable medium of claim 16, the instructions further comprising:

deconflicting addresses in the first private namespace and the second private namespace using information properties of the first VNIC and Second VNIC in the gateway server.

19. The non-transitory computer-readable medium of claim 18, the instructions further comprising:

maintaining two routing tables configured to provide for routing of messages between the service provider VCN and the first and second customer VCNs.

20. The non-transitory computer-readable medium of claim 19, the instructions further comprising:

providing a managed service comprises providing a managed etcd-as-a-service.

* * * * *

UNITED STATES PATENT AND TRADEMARK OFFICE
CERTIFICATE OF CORRECTION

PATENT NO. : 10,721,095 B2
APPLICATION NO. : 15/970713
DATED : July 21, 2020
INVENTOR(S) : Sahoo et al.

It is certified that error appears in the above-identified patent and that said Letters Patent is hereby corrected as shown below:

On the Title Page

Page 2, Column 2, item [56], Line 12, delete "Hetergeneous" and insert -- Heterogeneous --, therefor.

In the Specification

Column 14, Line 14, delete "services services" and insert -- services --, therefor.

In the Claims

Column 18, Line 11, Claim 6, delete "a the" and insert -- the --, therefor.

Column 18, Line 64, Claim 11, delete "deconflictinq" and insert -- deconflicting --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*